United States Patent
Friepes

(10) Patent No.: US 6,588,924 B1
(45) Date of Patent: Jul. 8, 2003

(54) DISPLAY UNIT WITH A FRONT INSTRUMENT PANEL AND PROCESS FOR PRODUCING SUCH A FRONT INSTRUMENT PANEL

(75) Inventor: Gerhard Friepes, Bad Nauheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/519,132

(22) Filed: Mar. 6, 2000

(30) Foreign Application Priority Data

Mar. 8, 1999 (DE) .......................... 199 10 241

(51) Int. Cl.[7] .............. B60Q 1/00; B60Q 1/26
(52) U.S. Cl. ............ 362/489; 362/362; 362/30; 362/26; 700/83
(58) Field of Search ................ 700/83; 108/45; 362/489, 362, 23, 26, 29, 30, 24

(56) References Cited

U.S. PATENT DOCUMENTS

| | | | | |
|---|---|---|---|---|
| 4,323,951 A | * | 4/1982 | Pasco ........................ | 362/27 |
| 4,975,807 A | * | 12/1990 | Ohashi ...................... | 362/23 |
| 5,095,409 A | * | 3/1992 | Dematteo et al. ........... | 362/23 |
| 5,477,430 A | * | 12/1995 | LaRose ...................... | 362/84 |
| 5,537,300 A | * | 7/1996 | Kraines et al. .............. | 362/86 |
| 5,895,115 A | * | 4/1999 | Parker et al. ............... | 362/511 |
| 6,099,152 A | * | 8/2000 | Naganawa et al. .......... | 362/489 |
| 6,267,072 B1 | * | 7/2001 | Seto et al. .................. | 116/287 |
| 6,413,598 B1 | * | 7/2002 | Motoki et al. .............. | 428/35.7 |
| 6,508,563 B2 | * | 1/2003 | Parker et al. ............... | 362/29 |
| 2002/0114153 A1 | * | 8/2002 | Chan et al. ................. | 362/85 |

FOREIGN PATENT DOCUMENTS

| | | | | |
|---|---|---|---|---|
| DE | 8319332 | | 10/1983 | ......... G09F/13/08 |
| DE | 19702957 | | 8/1998 | ......... G05G/1/02 |
| EP | 0562332 A1 | * | 9/1993 | ......... B60Q/3/04 |
| FR | 2583558 A1 | * | 12/1986 | ......... B60Q/3/04 |
| GB | 2099222 A | * | 12/1982 | ......... B60K/37/06 |

* cited by examiner

*Primary Examiner*—John Follansbee
*Assistant Examiner*—Crystal J. Barnes
(74) *Attorney, Agent, or Firm*—Martin A. Farber

(57) ABSTRACT

In a display unit there is provided a front instrument panel (2) for inscription with symbols (9), which have an opaque portion (12) enclosed by a transparent portion (11), a so-called island. This opaque portion (12) is applied to a transparent backing (15) and fitted into an opening (13), made in the front instrument panel (2) to correspond to the contour of the symbol (9), at a distance from an edge region (20) of the opening (13). Use of the backing (15) makes it possible to dispense with connecting cross-pieces between the island and the front instrument panel (2). Furthermore, a process for producing the front instrument panel (2) intended for the display unit is provided, in which process firstly the opening (13) is made by punching and the backing (15) is formed by film-insert molding a transparent plastic behind the front instrument panel (2).

15 Claims, 1 Drawing Sheet

DISPLAY UNIT WITH A FRONT INSTRUMENT PANEL AND PROCESS FOR PRODUCING SUCH A FRONT INSTRUMENT PANEL

FIELD AND BACKGROUND OF THE INVENTION

The invention concerns a display unit, in particular for a vehicle, with a front instrument panel which is provided with symbols which have a transparent portion and a portion which is enclosed by the transparent portion and is substantially opaque, and which has a light source arranged behind the front instrument panel for illuminating by the transmitted light method. The invention furthermore concerns a process for producing a front instrument panel which is intended for a display unit.

Such display units are often used in modern motor vehicles as instrument clusters and are consequently known.

For this purpose, the front instrument panel is transparent and is subsequently provided with a substantially opaque coating. The symbols are in this case cut out, so that the symbols formed, for example as numbers or letters, can be transilluminated from behind in a negative representation by means of the light source. Therefore, the symbols, as a light area, form a good contrast with respect to the otherwise dark front instrument panel and are consequently easily readable.

Following the changing tastes of the time, front instrument panels of this kind that are produced from an opaque material, such as wood for example, or have a surface structure or curved shaping are increasingly desired. In order to make the symbols likewise able to be transilluminated in displays designed in this way, it could be conceivable to provide corresponding cutouts.

However, if this is carried out, it proves to be disadvantageous that various symbols have opaque portions enclosed by the transparent portion. Such "islands" occur for example in the case of the numbers "0", "4", "6", "8" or the letters "A", "B", "D", "R". As a result, cross-pieces are required to fix the enclosed portions in their position, since otherwise the enclosed regions would fall out. These cross-pieces, lying in the permanent field of view of a vehicle driver, detract from readability, however, and give a impression of inferior quality. This has led in practice to front instrument panels merely being laminated with an opaque screen, while the symbols are just applied to the transparent front instrument panel.

SUMMARY OF THE INVENTION

The invention is based on the problem of providing a display unit of the type stated at the beginning in such a way that the front instrument panel can be produced from any desired material, in particular opaque material. It is also intended here for symbols which have enclosed opaque portions to do without cross-pieces. Furthermore, a process for producing a front instrument panel intended for the display is to be provided.

The first-mentioned problem is solved according to the invention by the substantially transparent portion being formed by an opening in the front instrument panel and the substantially opaque portion being arranged on a transparent backing and fitted into the opening from a rear side of the front instrument panel, at a distance from an edge region of said opening. As a result, the symbol can initially be configured as an opening, corresponding to its outer contour, in the front instrument panel. The enclosed, opaque portion is arranged on a transparent backing, which is consequently invisible to a viewer. This backing also dispenses with an otherwise necessary cross-piece, since the enclosed region is fixed only on the backing. Furthermore, as a result, the opaque region can be optionally produced from the cut-out portion or from any other desired material.

For this purpose, the backing could bear against the rear side of the front instrument panel. A particularly advantageous development of the invention is provided, on the other hand, if the backing fills the opening. As a result, the backing closes the opening and at the same time allows the backing to be terminated uniformly in a plane with the front instrument panel. This allows reflections and uneven light distribution to be avoided. At the same time, there is no need for a step in the region of the opening between the front side of the front instrument panel and the backing, avoiding possible shadow formation and improving the visual impression.

Another advantageous embodiment is also provided if the backing protrudes through the opening and stands out slightly from a front side of the front instrument panel facing a viewer. This allows a three-dimensional impression to be achieved, at the same time allowing the readability to be improved even from an unusually acute viewing angle. In this case, the surface of the backing may, for example, also be curved or three-dimensionally shaped.

In this arrangement, the backing could stand out over the entire surface area of the opening. Particularly favorable, on the other hand, is a development of the invention in which the backing stands out from the front instrument panel only in the region of the opaque portion. As a result, the backing can initially be fitted through the opening from the rear. The portion standing out from the front instrument panel then merely has to be provided with an opaque coating or the surface has to be correspondingly treated. At the same time, the readability is further improved by the optically graduated opaque region. What is more, an arrangement of the opaque portion that is assigned exactly to the opening, for example a central arrangement, can consequently be ensured in a simple way.

Another particularly favorable embodiment is also obtained if the opaque portion is formed by a covering arranged on the backing. This covering may also be, for example, the previously cut-out part of the opening, so that a homogeneous appearance is achieved. Furthermore, by appropriate shaping of the covering, for example as a covering cap, installation can be significantly facilitated.

Particularly recommendable in this case is a design of the invention in which the opaque portion and the front instrument panel have largely coinciding coloring. This means that, even if different materials are used, for the viewer of the display unit there is no evident difference between the opaque portion and the front instrument panel.

A particularly advantageous embodiment of the invention is provided if the backing is produced from a transparent plastic. The plastic can be easily shaped and consequently be adapted optimally both to the front instrument panel and to the openings, so that production is significantly simplified. In particular, the backing may at the same time also be made for use with a plurality of openings and, if appropriate, be provided with portions of different thicknesses.

A particularly attractive design of the display unit can be achieved by the backing being colored. In this case, the coloration of the symbols makes them stand out visually and easy to read as a result. At the same time, different colorations can also be realized in different regions of the backing.

Another particularly favorable development of the invention is achieved if the backing is diffusely transparent. As a result, a light distribution that is even over the entire surface area of the opening is achieved, it being possible at the same time to prevent the viewer from being dazzled by the light source. For this purpose, the backing may be produced, for example, from a smoked glass or frosted glass.

The backing may be produced as a separate molding and, depending on the instrumentational variant of the display unit, be joined to the front instrument panel. Particularly simple is also an embodiment of the invention in which the transparent backing is a plate joined in one part to the front instrument panel. This permits simple production and has a low space requirement. The backing may in this case also serve at the same time for mechanically stabilizing the front instrument panel, allowing materials of low dimensional stability also to be used for production. For example, cloths, woven fabrics, veneers or even thin films may be used for this.

The backing may in this case also be designed at the same time as a light guide, in order to simplify illumination.

The second-mentioned problem, that of providing a process for producing a front instrument panel which is intended for a display unit and is provided with symbols which have a transparent portion and a substantially opaque portion enclosed by the transparent portion, is achieved according to the invention by, in a first step, providing openings which form the transparent portion on the front instrument panel and subsequently fitting the opaque portion, arranged on a transparent backing, into the opening from a rear side of the front instrument panel at a distance from an edge region of said opening. This process makes it possible to produce the front instrument panel from any desired, in particular opaque, material and nevertheless to dispense with connecting cross-pieces between the enclosed, opaque portion of the symbol and the front instrument panel. At the same time, the transparent backing serves for positioning and fixing the opaque portion at the required distance from the edge region of the opening. The backing itself is in this case invisible to a viewer.

The backing may be a molding which, after making the opening, is arranged on the rear side of the front instrument panel. Particularly well suited, on the other hand, is an embodiment of the process according to the invention in which the backing is produced by film-insert molding a transparent plastic, in particular acrylic glass, behind the front instrument panel. This allows the backing to be optimally adapted to differently shaped front instrument panels and at the same time makes it possible to increase the mechanical load-bearing capacity of the structural unit created in this way. In this case, different material thicknesses and different colorings can also be realized, significantly widening the range of applications. At the same time, film-insert molding allows production expenditure to be reduced and the visual appearance to be achieved by a tolerance-free transition between the backing material and the front instrument panel in the region of the opening.

Particularly simple is also a refinement of the process in which the openings are punched out. The opening created in this way can be reproduced with great accuracy and has a satisfactory surface finish, in particular in the edge region of the opening. Furthermore, this makes it possible for the punched-out portion to be used further, in that it is initially joined to the backing and subsequently positioned in the opening by means of the backing.

Particularly useful is an embodiment of the invention by which the backing is joined to the front instrument panel such that it stands out from the front instrument panel only in the region of the opaque portion. This on the one hand improves the readability of the symbol created in this way, by virtue of the three-dimensional impression, on other hand it allows the opaque portion to be applied unproblematically from the front side after applying the backing, in particular also after the film-insert molding.

The opaque portion of the backing may be created by a covering which can be placed on. A particularly advantageous refinement of the process according to the invention is achieved, on the other hand, if the opaque portion of the backing is produced by applying a coating. This allows the installation work to be simplified and at the same time allows an individual coating to be optionally applied according to the particular variant.

At the same time, the process is performed in a particularly simple manner if the opaque portion of the backing is printed on by the screen printing process. This allows the opaque portion to be applied both simply and unproblematically, the high quality of the screen printing process ensuring an optimum surface finish throughout the entire service life. If the opaque portion of the backing stands out from the front instrument panel, it is possible to print on the opaque portion very easily, without having to take any special precautions to prevent unintentional printing on the front instrument panel.

BRIEF DESCRIPTION OF THE DRAWING

The device according to the invention and the process for producing the device allow various modifications. For further illustration of the invention, reference is made below to the drawing, in which.

DETAILED DESCRIPTION OF THE PREFERRED EMBODIMENTS

Figure 1:
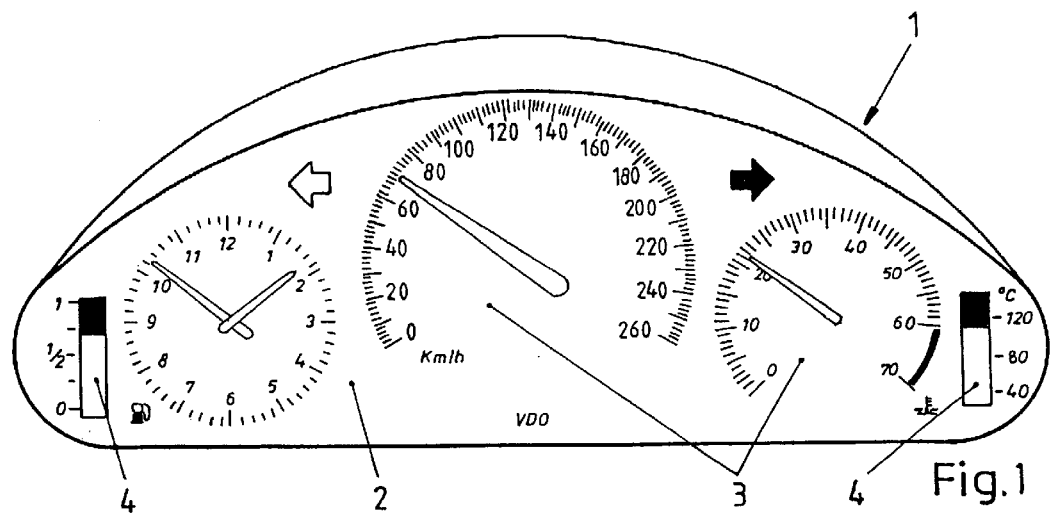
FIG. 1 shows a front view of a display unit according to the invention with a front instrument panel.

FIG. 1 shows in a front view a display unit 1 according to the invention, with a front instrument panel 2. The display unit 1 has a plurality of round instruments 3 and further displays 4.

Figure 2:
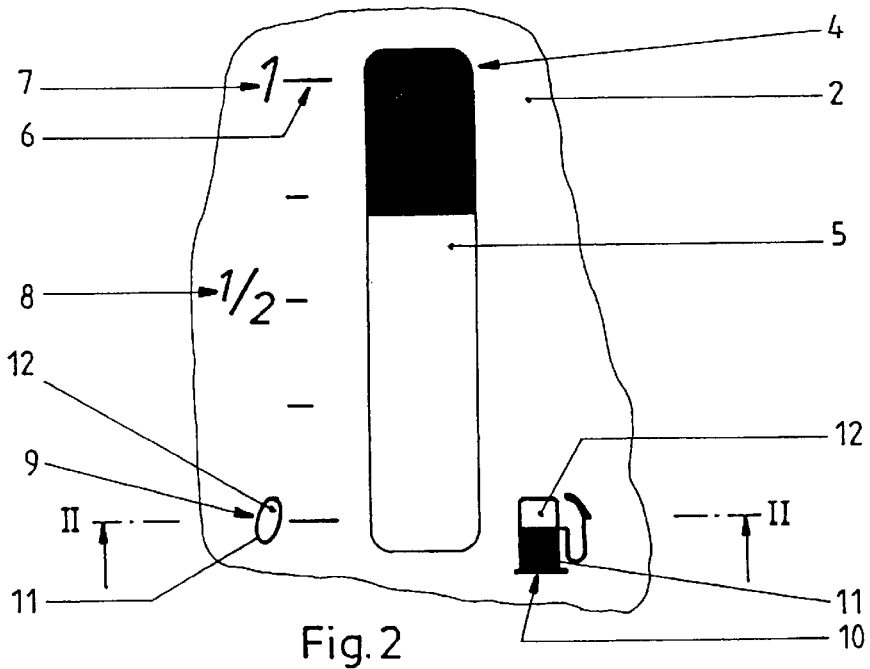
FIG. 2 shows an enlarged representation of a portion of the front instrument panel with various symbols.

FIG. 2 shows one of these displays 4 in an enlarged representation of a portion of the front instrument panel 2. The display 4, designed as a fuel display, has a strip indicator 5, which indicates the filling state. Serving for this purpose is a graduation 6 with a number of symbols 7, 8, 9. Furthermore, the display 4 has a symbol 10, designed as a stylized filling pump, for easier identification of the display 4. The symbols 9 and 10 are essential for the invention. They have in each case a transparent portion 11, which can be transilluminated and is shown dark in FIG. 2, and an opaque portion 12, which is enclosed by the transparent portion 11.

Figure 3:
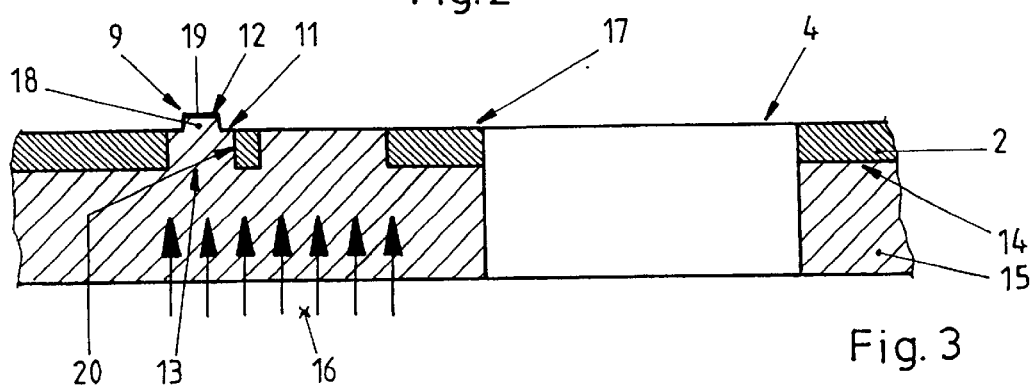
FIG. 3 shows a view taken in section along the line II—II of FIG. 2 of the front instrument panel with a backing.

The structural design of the symbol 9 of the display 4 formed by the number "0" becomes clear from FIG. 3. This shows a representation of the front instrument panel 2 taken in section along the line II—II of FIG. 2. An opening 13, determined by the contour of the symbol 9, in the front instrument panel 2 can be seen. Fitted into this opening 13 is a transparent backing 15, which is joined to a rear side 14 of the front instrument panel 2. Symbolically represented by arrow symbols 16 is the light of a light source (not shown)

passing through the backing 15. This light then leaves at a front side 17 of the opening 13 in such a way that it is visible to a viewer. In this case, the opaque portion 12, enclosed by the transparent portion 11, is formed by a region 18 of the backing 15 which projects from the front instrument panel 2 and for this purpose is provided with a covering 19. This covering 19, made in particular to match the front instrument panel 2 in color, consequently makes possible an arrangement of the opaque portion 12 at a distance from an edge region 20 of the opening 13, without connecting crosspieces being required for this purpose between the opaque portion 12 and the front instrument panel 2. At the same time, a three-dimensional impression of the symbol 9 is created, thereby achieving easy readability.

I claim:

1. A display unit, in particular for a vehicle, with a front instrument panel which is provided with symbols which have a substantially transparent portion and a portion which is enclosed by the transparent portion and is substantially opaque, and which has a light source arranged behind the front instrument panel for illuminating by a transmitted light method, wherein a substantially transparent portion (11) is formed by an opening (13) in the front instrument panel (2) and the substantially opaque portion (12) is arranged on a transparent backing (15) and fitted into the opening (13) from a rear side (14) of the front instrument panel (2), at a distance from an edge region (20) of said opening to enable light to pass between the edge region of the opening and the opaque portion, wherein the backing (15) protrudes through the opening (13) and stands out slightly from a front side (17) of the front instrument panel (2) facing a viewer to enable light to pass from behind the opaque region to the viewer over an enlarged viewing angle.

2. The display unit as claimed in claim 1, wherein said backing (15) fills the opening (13).

3. The display unit as claimed in claim 1, wherein the backing (15) stands out from the front instrument panel (2) only in a region of the opaque portion (12).

4. The display unit as claimed in claim 1, wherein the opaque portion (12) is formed by a covering (19) arranged on the backing (15).

5. The display unit as claimed in claim 1, wherein the opaque portion (12) and the front instrument panel (2) have substantially coinciding coloring.

6. The display unit as claimed in claim 1, wherein the backing (15) is produced from a transparent plastic.

7. The display unit as claimed in claim 1, wherein the backing (15) is colored.

8. The display unit as claimed in claim 1, wherein the backing (15) is diffusely transparent.

9. The display unit as claimed in claim 1, wherein the transparent backing (15) is a plate joined in one part to the front instrument panel (2).

10. A process for producing a front instrument panel intended for a display unit and provided with symbols which have a substantially transparent portion and a substantially opaque portion enclosed by the transparent portion, the process comprising the steps wherein, in a first step, openings which form the transparent portion are provided on the front instrument panel and subsequently the opaque portion, arranged on a transparent backing, is fitted into the opening from a rear side of the front instrument panel at a distance from an edge region of said opening, wherein the backing is joined to the front instrument panel such that it protrudes from the front instrument panel only in a region of the opaque portion, and a positioning of the opaque portion at a distance from an edge region (20) of said opening enables light to pass between the edge region of the opening and the opaque portion, and enables light to pass from behind the opaque region to the viewer over an enlarged viewing angle.

11. The process as claimed in claim 10, further comprising the step wherein the backing is produced by film-insert molding a transparent plastic behind the front instrument panel.

12. The process as claimed in claim 11, wherein the transparent plastic is acrylic glass.

13. The process as claimed in claim 10, wherein the openings are punched out.

14. The process as claimed in claim 10, wherein the opaque portion of the backing is produced by applying a coating.

15. The process as claimed in claim 14, wherein the opaque portion of the backing is printed on by a screen printing process.

* * * * *